(12) United States Patent
Mizuno et al.

(10) Patent No.: US 10,287,806 B2
(45) Date of Patent: May 14, 2019

(54) LATCH DEVICE FOR TRUNK LID OF VEHICLE

(71) Applicant: MITSUI KINZOKU ACT CORPORATION, Kanagawa (JP)

(72) Inventors: Takaaki Mizuno, Kanagawa (JP); Nao Mizumoto, Kanagawa (JP); Tomokazu Ito, Kanagawa (JP)

(73) Assignee: MITSUI KINZOKU ACT CORPORATION, Kanagawa (JP)

( * ) Notice: Subject to any disclaimer, the term of this patent is extended or adjusted under 35 U.S.C. 154(b) by 642 days.

(21) Appl. No.: 14/979,660

(22) Filed: Dec. 28, 2015

(65) Prior Publication Data

US 2016/0201362 A1    Jul. 14, 2016

(30) Foreign Application Priority Data

Jan. 8, 2015 (JP) ................................. 2015-002690

(51) Int. Cl.
*B62D 25/12* (2006.01)
*E05B 79/10* (2014.01)
(Continued)

(52) U.S. Cl.
CPC .............. *E05B 81/56* (2013.01); *B62D 25/12* (2013.01); *E05B 79/10* (2013.01); *E05B 81/16* (2013.01);
(Continued)

(58) Field of Classification Search
CPC .......... E05B 81/56; E05B 83/18; E05B 81/16; E05B 79/10; E05B 85/243; E05B 81/36;
(Continued)

(56) References Cited

U.S. PATENT DOCUMENTS

| | | | |
|---|---|---|---|
| 5,632,515 A | 5/1997 | Dowling | |
| 6,369,395 B1 * | 4/2002 | Roessler | ................. E05B 83/16 250/462.1 |

(Continued)

FOREIGN PATENT DOCUMENTS

| | | |
|---|---|---|
| CN | 202347957 U | 7/2012 |
| CN | 102753777 A | 10/2012 |

(Continued)

OTHER PUBLICATIONS

Office Action dated Aug. 15, 2017, issued in correspondence Chinese Patent Application No. 201510983293.4, with English language translation.

*Primary Examiner* — Kristina R Fulton
*Assistant Examiner* — Thomas L Neubauer
(74) *Attorney, Agent, or Firm* — McDermott Will & Emery LLP (57) ABSTRACT

The latch device for the trunk lid of the vehicle includes an electric open lever that causes a ratchet to withdraw from a latch when the electric open lever rotates, and a release actuator that rotates the electric open lever. An output gear that rotates by driving force of the release actuator is provided near the electric open lever, a pair of a first cam projection and a second cam projection with phases shifted from each other by 180 degrees is provided at the output gear, and the output gear is configured such that when the output gear rotates by 180 degrees, the first cam projection abuts against and rotates the electric open lever, and rotation of the output gear is blocked by the second cam projection abutting against the rotated electric open lever.

10 Claims, 10 Drawing Sheets

(51) Int. Cl.
  *E05B 81/56* (2014.01)
  *E05F 15/603* (2015.01)
  *E05C 3/12* (2006.01)
  *E05F 11/00* (2006.01)
  *E05B 81/16* (2014.01)
  *E05B 83/18* (2014.01)
  *E05B 81/66* (2014.01)
  *E05B 81/36* (2014.01)
  *E05B 83/06* (2014.01)
  *E05B 85/24* (2014.01)

(52) U.S. Cl.
  CPC ............... *E05B 83/18* (2013.01); *E05C 3/12* (2013.01); *E05F 11/00* (2013.01); *E05F 15/603* (2015.01); *E05B 81/36* (2013.01); *E05B 81/66* (2013.01); *E05B 83/06* (2013.01); *E05B 85/243* (2013.01)

(58) Field of Classification Search
  CPC .......... E05B 83/06; E05B 81/66; E05F 11/00; E05F 15/603; E05C 3/12; B62D 25/12
  USPC .................. 292/201, 216, DIG. 23, 279, 280
  See application file for complete search history.

(56) References Cited

U.S. PATENT DOCUMENTS

2008/0203737 A1*  8/2008  Tomaszewski ......... E05B 77/26
                                                        292/216
2012/0256429 A1   10/2012  Nagaoka et al.
2015/0091309 A1    4/2015  Nagaoka et al.

FOREIGN PATENT DOCUMENTS

| | | |
|---|---|---|
| CN | 104220686 A | 12/2014 |
| GB | 2357800 B | 12/2001 |
| JP | H07166750 A | 6/1995 |
| JP | 2739677 B2 | 4/1998 |
| JP | 2001-182400 A | 7/2001 |
| KR | 20060019060 A | 3/2006 |
| WO | WO-2013150681 A1 * | 10/2013 ............ E05B 81/14 |

* cited by examiner

LATCH DEVICE FOR TRUNK LID OF VEHICLE

CROSS-REFERENCE TO RELATED APPLICATION(S)

The present application claims priority to and incorporates by reference the entire contents of Japanese Patent Application No. 2015-002690 filed in Japan on Jan. 8, 2015.

BACKGROUND OF THE INVENTION

1. Field of the Invention

The disclosure relates to a latch device for a trunk lid (back door) of a vehicle.

2. Description of the Related Art

Conventionally, a latch device for a door of a vehicle includes a latch device provided with a power release mechanism that releases a ratchet from a latch by motive power of an actuator, such as a motor, to enable the door of the vehicle to be opened (for example, see Japanese Laid-open Patent Publication No. 07-166750 or Japanese Laid-open Patent Publication No. 2001-182400). A power release mechanism is often used in a latch device for a sliding door of a vehicle or a door that opens and closes a trunk room of a vehicle (a trunk lid or a back door, hereinafter, "trunk lid").

In contrast to a power release mechanism used for a sliding door, a power release mechanism used for a trunk lid often does not need to be combined with another mechanism, for example, a value adding mechanism, such as a lock mechanism, a child proof mechanism, an anti-theft mechanism, or a one-motion mechanism. Thus, simplification, weight reduction, and cost reduction have been the main challenges for development of the power release mechanism used for the trunk lid.

Therefore, the present invention simplifies coupling relations among a power release mechanism and levers of respective parts even more and improves the power release mechanism itself.

SUMMARY OF THE INVENTION

It is an object of the present invention to at least partially solve the problems in the conventional technology.

A latch device for a trunk lid of a vehicle according to one aspect of the present invention includes: a latch configured to engage with a striker; a ratchet configured to engage with the latch and to hold an engaged state between the latch and the striker; an electric open lever configured to cause the ratchet to withdraw from the latch when the electric open lever rotates; and a release actuator configured to rotate the electric open lever. An output gear configured to rotate by driving force of the release actuator is provided near the electric open lever. A pair of a first cam projection and a second cam projection with phases shifted from each other by 180 degrees is provided in the output gear. The output gear is configured such that the first cam projection abuts against the electric open lever and rotates the electric open lever when the output gear rotates by 180 degrees, and rotation of the output gear is blocked by the second cam projection abutting against the rotated electric open lever.

A latch device for the trunk lid of the vehicle according to another aspect of the present invention includes: a latch configured to engage with a striker; a ratchet configured to engage with the latch and to hold an engaged state between the latch and the striker; an electric open lever configured to cause the ratchet to withdraw from the latch; and a release actuator configured to rotate the electric open lever. An output gear configured to rotate by driving force of the release actuator is provided near the electric open lever. A pair of a first cam projection and a second cam projection with phases shifted from each other by 180 degrees is provided in the output gear. A follower corner portion and a stopper corner portion configured to be each displaceable to a position facing on a rotational track of the first cam projection and second cam projection and to a position off the rotational track are provided at the electric open lever. The latch device is configured such that the electric open lever is rotated and the ratchet is withdrawn from the latch, by the follower corner portion at the position facing on the rotational track abutting against one of the first cam projection and second cam projection when the output gear rotates, and being pushed out to the position off the rotational track when or before the output gear rotates by 180 degrees. The latch device is further configured such that the stopper corner portion at the position off the rotational track before the output gear rotates is displaced to the position facing on the rotational track by the rotation of the electric open lever when the ratchet is withdrawn from the latch by the rotation of the electric open lever. The latch device is configured such that the stopper corner portion displaced to the position facing on the rotational track abuts against the other one of the first cam projection and second cam projection and blocks rotation of the output gear upon and after the abutment, when the output gear rotates by 180 degrees.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A trunk lid latch device 10 has a latch unit 11, and a striker 12 that engages with the latch unit 11. In an embodiment illustrated in FIG. 1, the latch unit 11 is provided in a panel body 14 of a trunk lid 13 attached to a vehicle body by a hinge, and the striker 12 is fixed to a vehicle body 15. However, the disclosure may be applied to a case in which the striker 12 is fixed to the panel body 14 and the latch unit 11 is fixed to the vehicle body 15.

Figure 1:
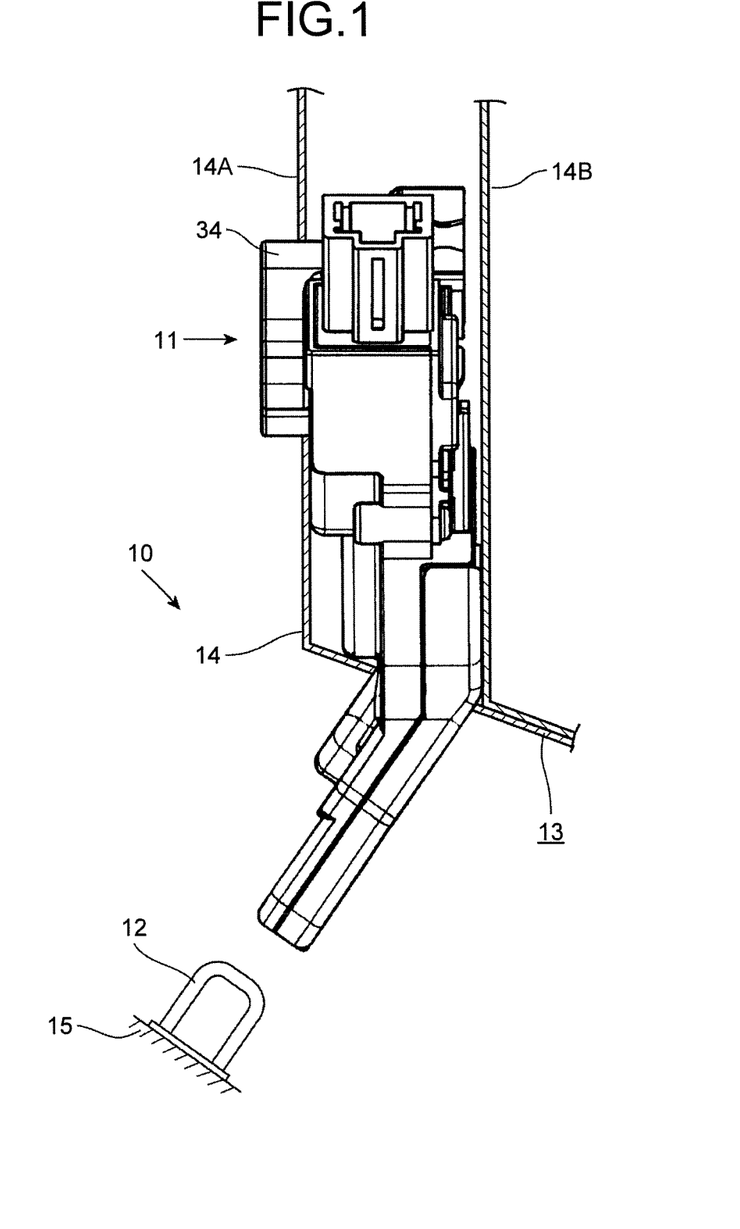
FIG. 1 is a longitudinal sectional view illustrating a latch device for a trunk lid and a panel body of the trunk lid.

The panel body 14 includes an outer metal panel (illustration thereof omitted) facing outside (outside of the vehicle), a lining panel 14A facing inside of the trunk room, and an inner metal panel 14B between the outer metal panel and the lining panel 14A.

The latch unit 11 includes a base member 16, which is vertically long. At a lower portion of the base member 16, a latch 17, which is engageable with the striker 12, is supported by a latch shaft 18. A ratchet 19 holds the engagement between the latch 17 and the striker 12, by engaging with the latch 17. This ratchet 19 is supported on the base member 16 by a ratchet shaft 20. The latch 17 is biased in a clockwise direction in FIG. 2 and FIG. 4 by a latch spring 21 (see FIG. 5). The ratchet 19 is biased in an anticlockwise direction in FIG. 2 and FIG. 4 by a ratchet spring 22 (see FIG. 5).

Figure 2:
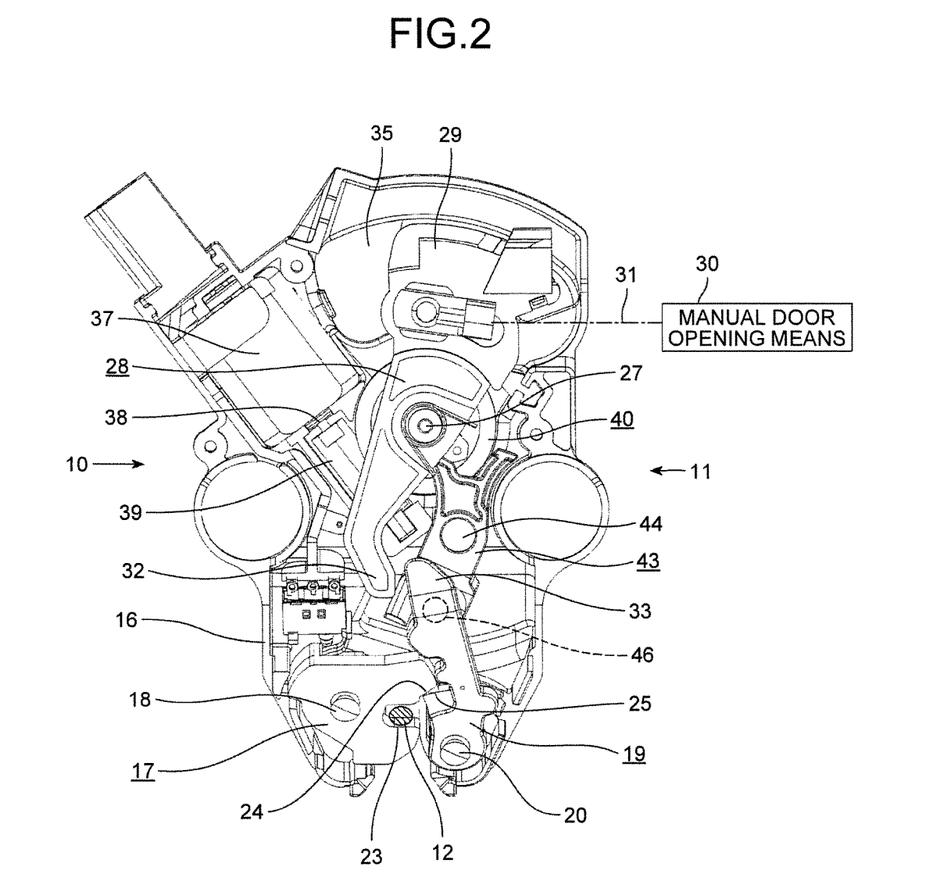
FIG. 2 is a front view of the latch device in a door-closed state.
Figure 3:
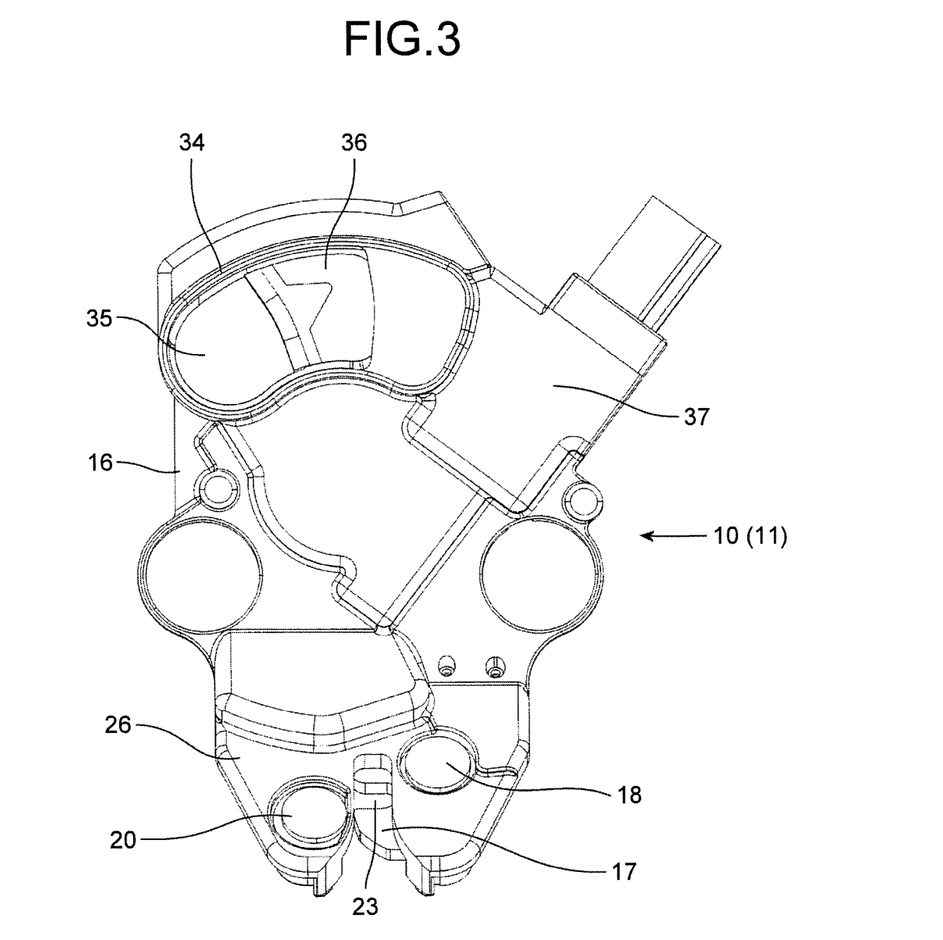
FIG. 3 is a rear view of the latch device in the door-closed state.
Figure 4:
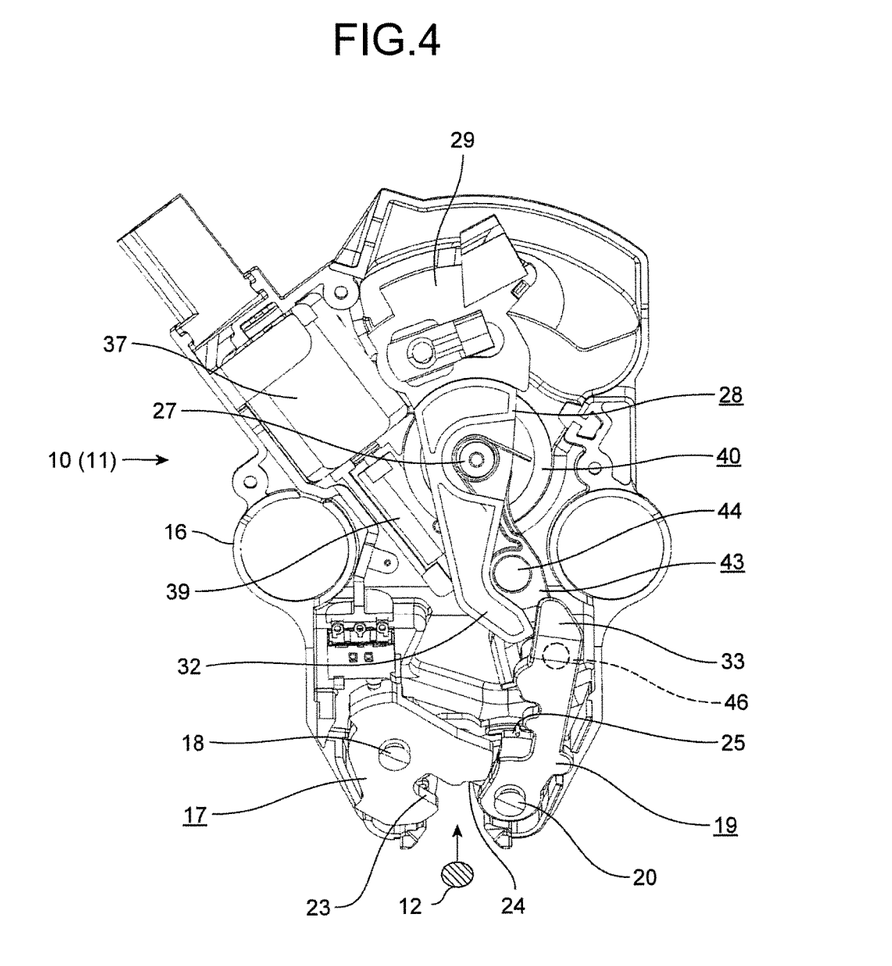
FIG. 4 is a front view of the latch device in a door-open state.
Figure 5:
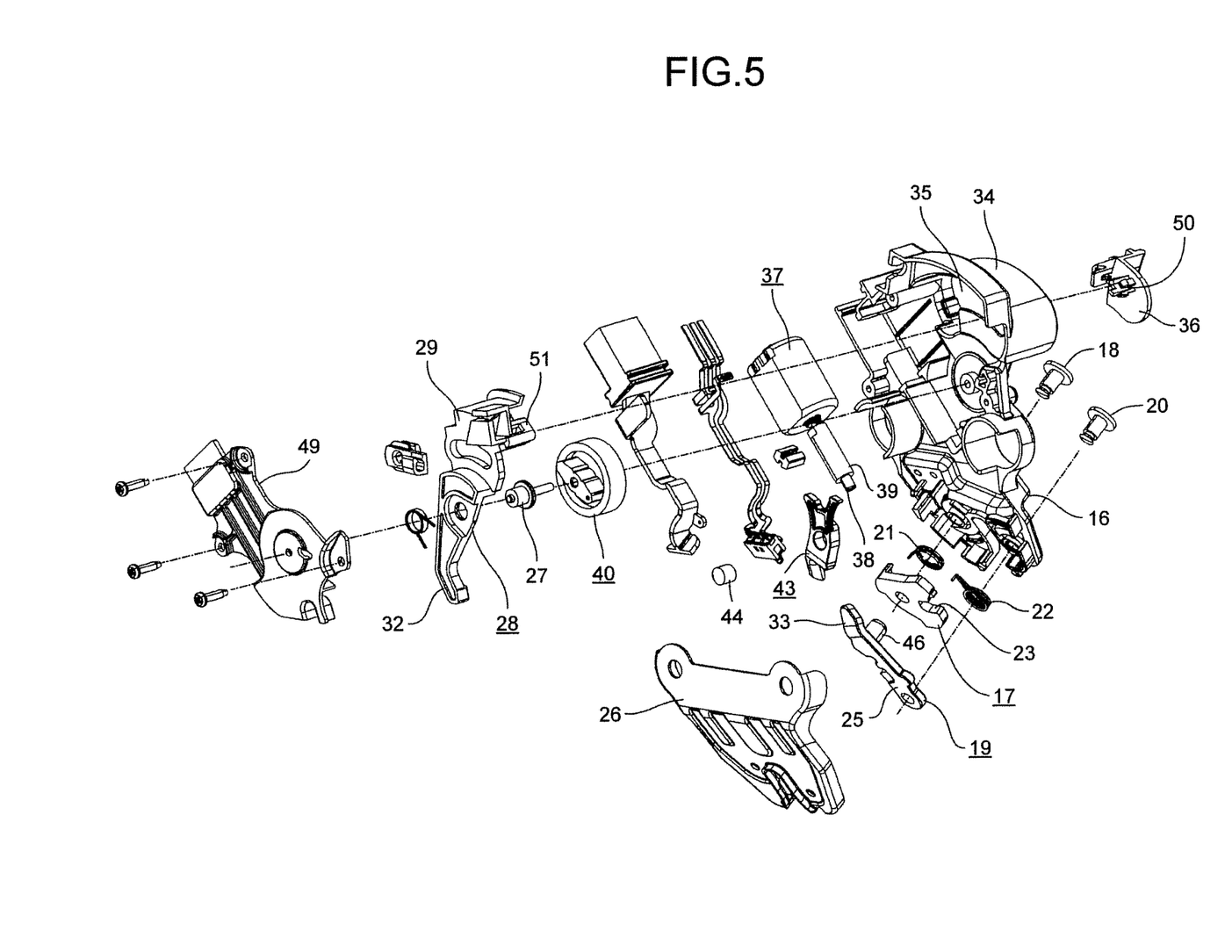
FIG. 5 is an exploded perspective view of the latch device.
Figure 6:
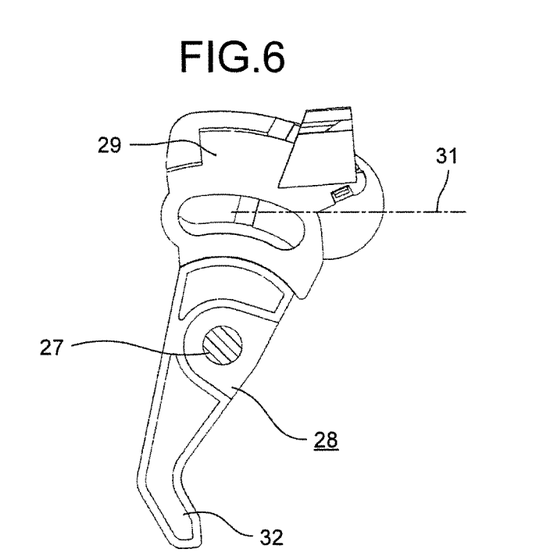
FIG. 6 is a front view of a manual open lever of the latch device.
Figure 7:
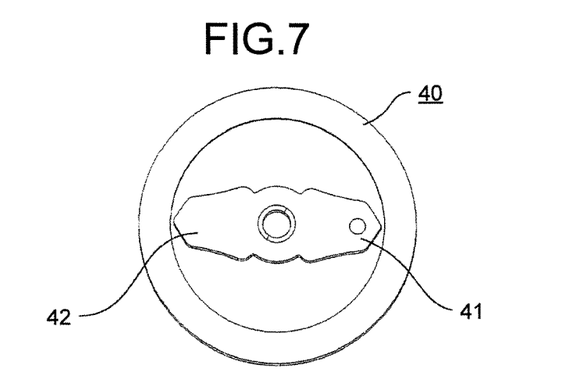
FIG. 7 is a front view of an output gear of the latch device.

When the trunk lid 13 is moved in a door closing direction, the striker 12 relatively moves in an arrow direction in FIG. 4, engages with a concave portion 23 of the latch 17, and rotates the latch 17 anticlockwise. When the latch 17 has been rotated to a latched position, as illustrated in FIG. 2, an engagement claw 25 of the ratchet 19 engages with a latch step portion 24 of the latch 17. Thereby, an engaged state between the latch 17 and the striker 12 is maintained and the trunk lid 13 is brought into a door-closed state.

Preferably, except for a part of the latch 17 and ratchet 19, the latch 17 and ratchet 19 are covered by a lower case 26.

At an approximate center of the base member 16, a center shaft 27 is arranged, and a manual open lever 28 is supported about the center shaft 27. A coupling arm 29 extending at an upper portion of the manual open lever 28 is coupled to a manual door opening unit 30, such as a trunk key cylinder or a trunk opener, via a coupling tool 31.

A distal end of an engagement arm 32 extending at a lower portion of the manual open lever 28 is positioned in the vicinity of and to be engageable with an engagement portion 33 extending at an upper portion of the ratchet 19. As illustrated in FIG. 2, in the door-closed state, when the manual open lever 28 is rotated anticlockwise by operation on the manual door opening unit 30, the distal end of the engagement arm 32 abuts against the engagement portion 33 and rotates the ratchet 19 clockwise. Thereby, the engagement claw 25 withdraws from the latch step portion 24, the latch 17 is released, and the trunk lid 13 is opened. This is opening of the door by normal manual operation.

At an upper portion of the base member 16, as illustrated in FIG. 1, a ring-shaped flange 34, which protrudes towards the trunk room, is provided. The ring-shaped flange 34 is preferably made to extend in the trunk room by being made to penetrate through the lining panel 14A. An inner side of the ring-shaped flange 34 is made to be open and made into an emergency operation hole 35.

An emergency operation knob 36 is attached to the coupling arm 29 of the manual open lever 28. The emergency operation knob 36 is exposed to the trunk room via the emergency operation hole 35 and is made operable from inside the trunk room. The emergency operation knob 36 is attached by a hook coupling portion 50 being inserted in a receiving portion 51 of the coupling arm 29.

An emergency symbol, such as text like "OPEN", or an arrow indicating an operation direction, is printed to be phosphorescent. Thereby, even if a child or the like is locked up in the trunk room by mistake, the child or the like is able to easily recognize the presence of the emergency operation knob 36. Even from inside the trunk room, if the emergency operation knob 36 is moved via the emergency operation hole 35 according to the indication by the symbol, the manual open lever 28 is rotated anticlockwise from the state in FIG. 2, the distal end of the engagement arm 32 abuts against the engagement portion 33, and thus the ratchet 19 is able to be rotated clockwise. Thereby, the engagement claw 25 withdraws from the latch step portion 24, the latch 17 is released, and the trunk lid 13 is opened, and thus escape from the trunk room becomes possible. This is opening of the door by emergency manual operation.

A release actuator 37 driven by a motor is attached to the base member 16. A gear 39, such as a worm gear, is fixed to an output shaft 38 of the release actuator 37, and an output gear 40, such as a worm wheel, which is circular, is meshed with the gear 39. The output gear 40 is supported about the center shaft 27. On one side of the output gear 40, a pair of a first cam projection 41 and a second cam projection 42, which interpose the center shaft 27 and are lined in a straight line, is provided integrally with each other.

Figure 8:
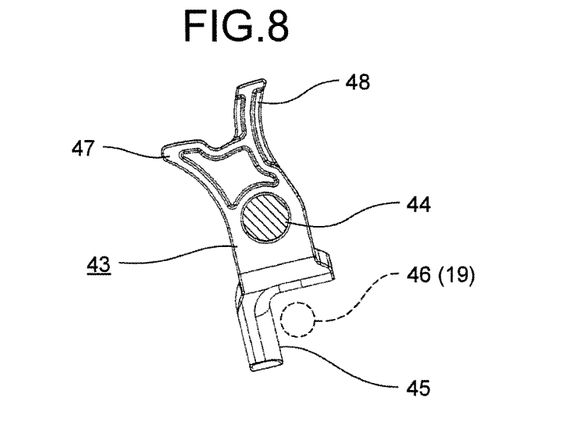
FIG. 8 is a front view of an electric open lever of the latch device.

Between the output gear 40 and the ratchet 19, an electric open lever 43 is arranged, and the electric open lever 43 is supported on the base member 16 about a support shaft 44. At a lower portion of the electric open lever 43, as illustrated in FIG. 8, a notched engagement portion 45, which is L-shaped, is formed, and the notched engagement portion 45 is faced by an engagement pin 46 provided on the ratchet 19. When the electric open lever 43 is rotated anticlockwise in FIG. 2, the notched engagement portion 45 abuts against the engagement pin 46 and rotates the ratchet 19 clockwise. Thereby, the engagement claw 25 withdraws from the latch step portion 24, the latch 17 is released, and the trunk lid 13 is opened.

At an upper portion of the electric open lever 43, a follower corner portion 47 and a stopper corner portion 48, which are bifurcated, are formed. The follower corner portion 47 and the stopper corner portion 48 are both displaceable to a position facing on a rotational track of the pair of cam projections 41 and 42 of the output gear 40 and to a position off the rotational track. Including this point, the overall motion will be described next.

Figure 9:
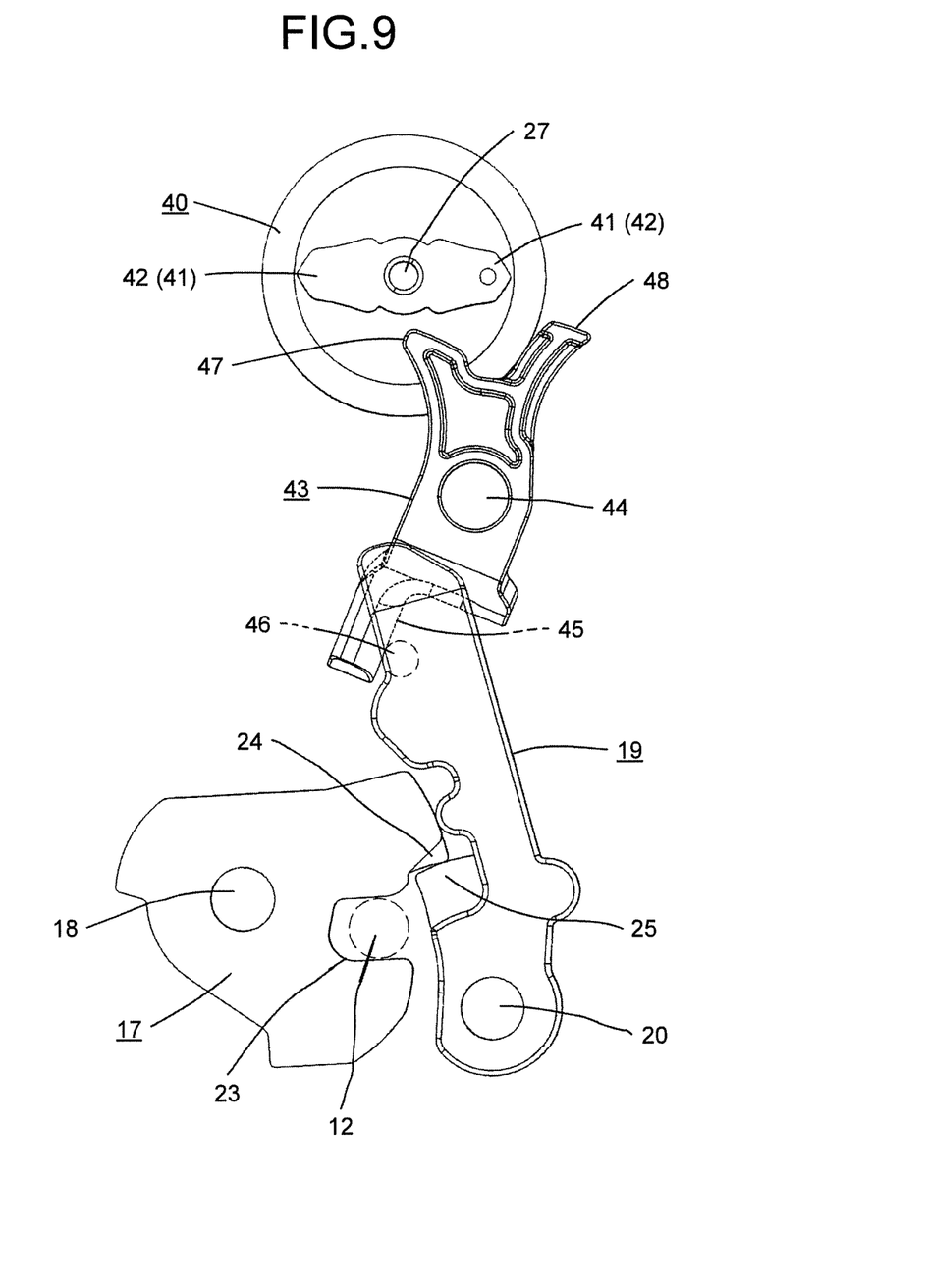
FIG. 9 is a diagram for description of operation, the diagram illustrating the door-closed state.

FIG. 9 illustrates the door-closed state, in which the ratchet 19 is engaged with the latch 17. In this state, the cam projections 41 and 42 of the output gear 40 extend in a substantially horizontal direction. By the release actuator 37 being OFF, the output gear 40 is kept in this position. Further, the follower corner portion 47 of the electric open lever 43 is positioned on the rotational track of the cam projections 41 and 42. In contrast, the stopper corner portion 48 is off the rotational track of the cam projections 41 and 42.

Figure 10:
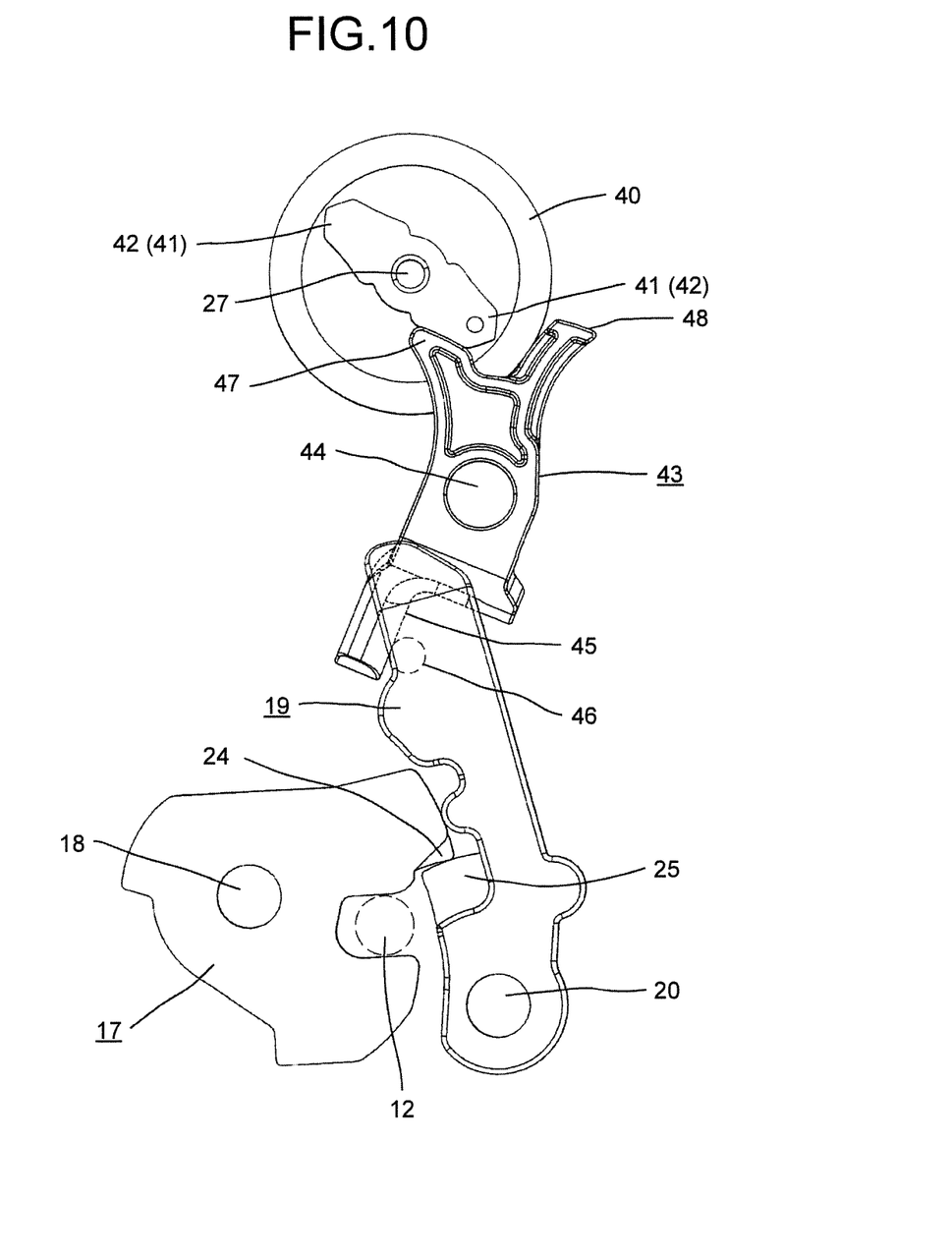
FIG. 10 is a diagram for description of operation, the diagram illustrating a state in which a cam projection of the output gear has been rotated until the cam projection abuts against a follower corner portion of the electric open lever from the state in FIG. 9.

If the output gear 40 is rotated clockwise by the release actuator 37 from the state in FIG. 9, the first cam projection 41 (or the second cam projection 42) abuts against the follower corner portion 47 and the electric open lever 43 is rotated anticlockwise. As the electric open lever 43 is rotated anticlockwise, the notched engagement portion 45 abuts against the engagement pin 46 of the ratchet 19, the ratchet 19 is rotated clockwise, and via a state in FIG. 10, as illustrated in FIG. 11, the ratchet 19 is withdrawn from the latch 17 and the trunk lid 13 is opened.

Figure 11:
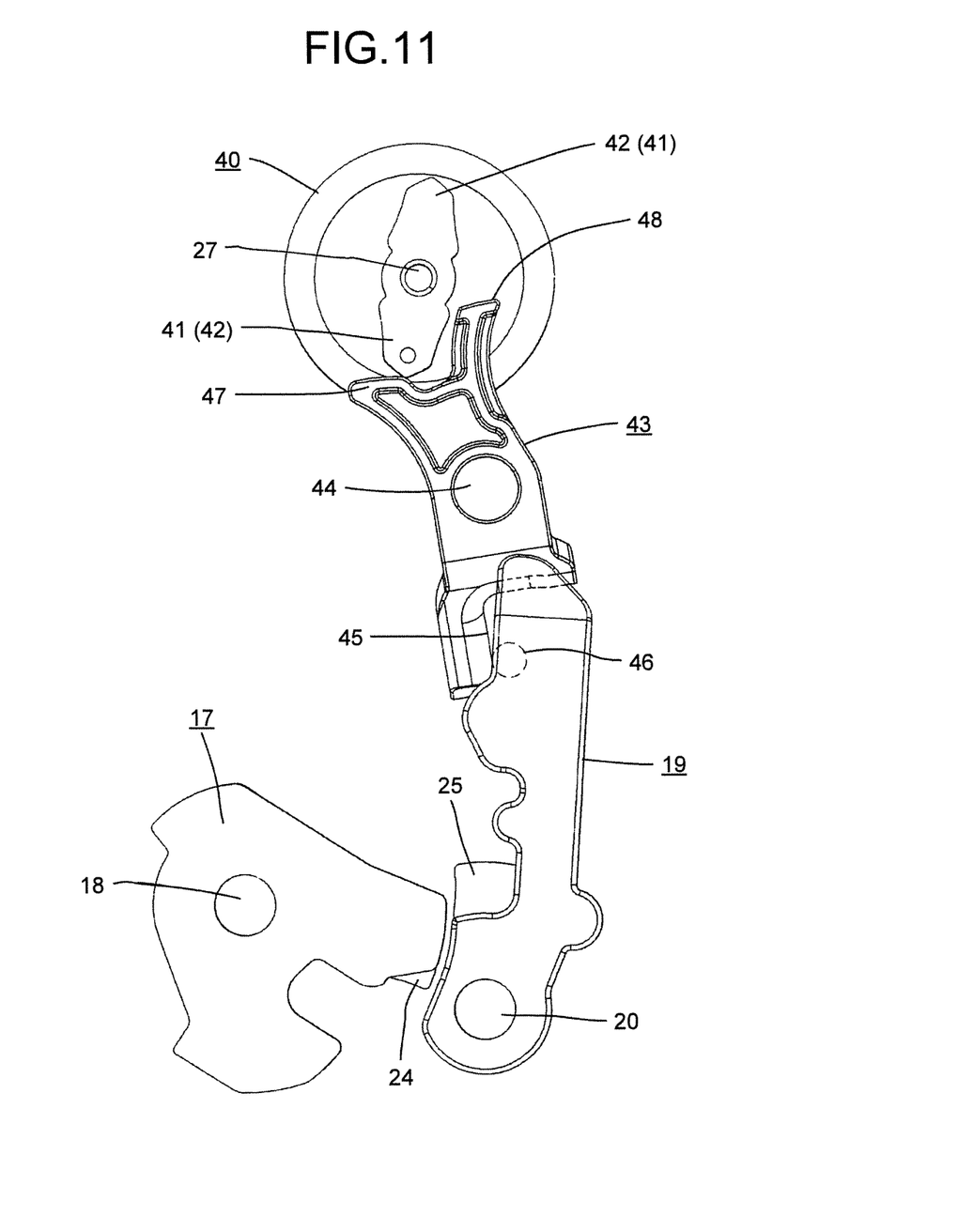
FIG. 11 is a diagram for description of operation, the diagram illustrating a state in which the output gear has been rotated from the state in FIG. 10 and a ratchet has been withdrawn from a latch.

As illustrated in FIG. 11, after the ratchet 19 is withdrawn from the latch 17, the follower corner portion 47 is pushed by the first cam projection 41 (or the second cam projection 42) and pushed out to outside of the rotational track of the first cam projection 41 (or the second cam projection 42). On the contrary, the stopper corner portion 48 of the electric open lever 43 is displaced onto the rotational track of the second cam projection 42 (or the first cam projection 41). When the output gear 40 rotates by approximately 180 degrees, as illustrated in FIG. 12, the second cam projection 42 (or the first cam projection 41) abuts against the stopper corner portion 48, and the stopper corner portion 48 blocks and stops rotation of the output gear 40.

Figure 12:
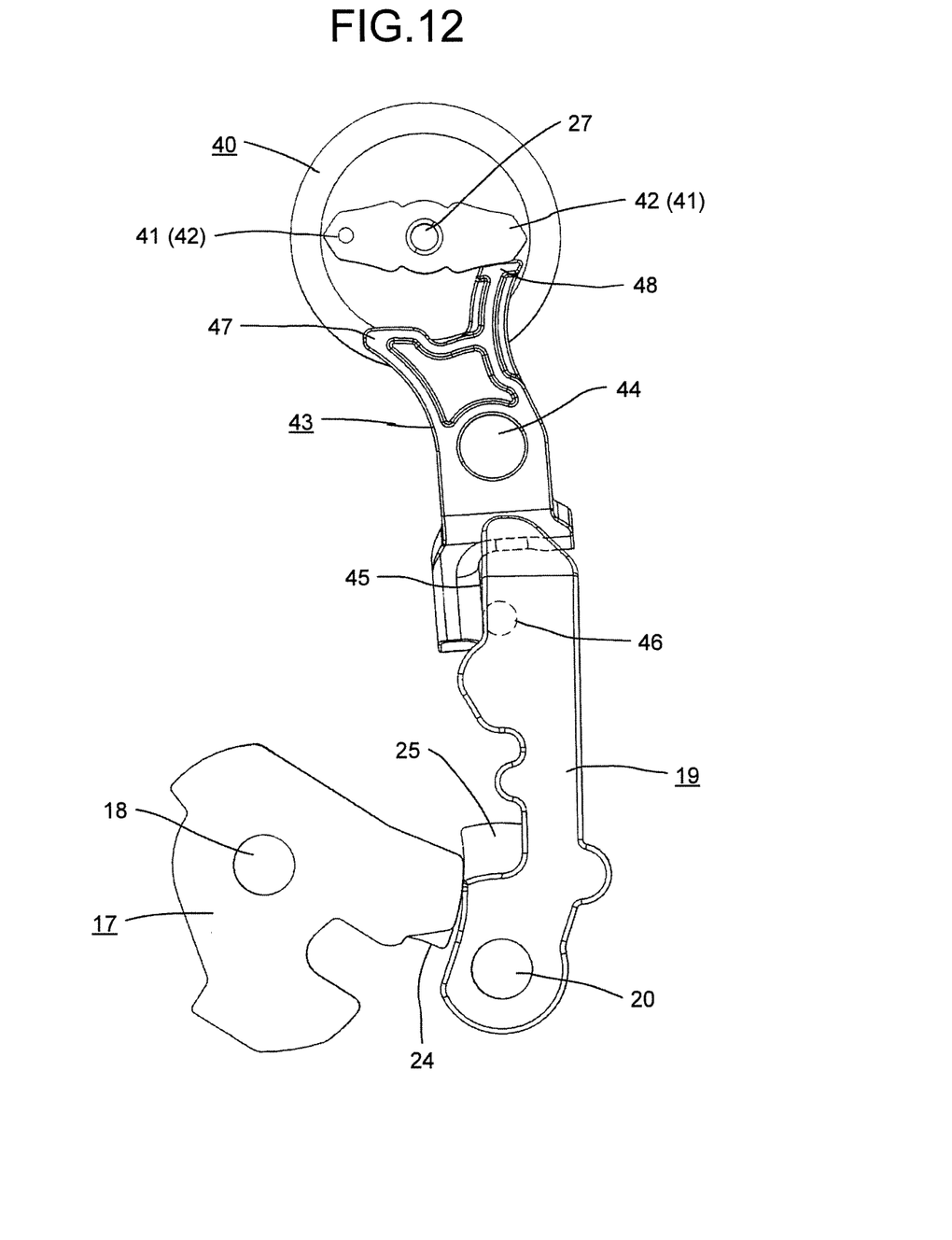
FIG. 12 is a diagram for description of operation, the diagram illustrating the door-open state.

As illustrated in FIG. 12, when the second cam projection 42 (or the first cam projection 41) abuts against the stopper corner portion 48, the release actuator 37 is turned OFF (preferably, the release actuator 37 is automatically turned OFF after operating over a certain period), and a door-open state is maintained. By the release actuator 37 being turned OFF, the output gear 40 is also maintained in that position due to resistance of a reduction mechanism on the release actuator 37 side.

When the trunk lid 13 is moved in the door closing direction, the striker 12 abuts against the latch 17 and rotates the latch 17 anticlockwise. As a result, the ratchet 19 engages with the latch step portion 24 of the latch 17 again by resilience of the ratchet spring 22. According to this motion of the ratchet 19, the notched engagement portion 45 is pressed by the engagement pin 46 of the ratchet 19, the electric open lever 43 is rotated clockwise, the stopper corner portion 48 is displaced to outside of the rotational track of the second cam projection 42 (or first cam projection 41), and the door-closed state in FIG. 9 is reached.

In assembly of the latch unit 11 as described above, since almost all of the parts are arranged on one side of the base member 16, by assembling the parts in order, easy assembly is achieved.

Specifically, if the latch 17 and ratchet 19 are supported on the base member 16 about the latch shaft 18, and ratchet shaft 20 and are covered by the lower case 26, assembly is completed just by the assembly from one side. Further, the electric open lever 43 is able to be assembled to the base member 16 by the support shaft 44 from one side. The output gear 40 and the manual open lever 28 are able to be assembled to the base member 16 by the center shaft 27 from one side. After covering with a cover member 49, assembly is nearly completed, and finally, as the hook coupling portion 50 of the emergency operation knob 36 is inserted into the receiving portion 51 of the manual open lever 28 from a reverse side of the base member 16, the assembly is completed. As described, since assembly work of reversing the base member 16 to-and-fro is able to be largely omitted, danger of any parts coming off is able to be reduced. Further, when the emergency operation knob 36 is installed, the assembly is already in a state where the parts will not come off even if the base member 16 is turned over, and thus reliable assembly is able to be expected.

According to the disclosure, since the output gear 40 that rotates by the release actuator 37 rotates by approximately 180 degrees in a single operation, the door is able to be opened with an amount of rotation less than the conventional amount, that is, in a short operation period.

Further, according to the disclosure, since a return spring for returning the output gear 40 to a neutral position is unnecessary, the number of parts is reduced, and thus various effects are able to be expected, including burdensome assembly work for the spring being able to be omitted, the rotational resistance of the release actuator 37 being able to be reduced, and occurrence of malfunctions due to damage to the return spring being able to be avoided.

Furthermore, since the manual open lever 28 is supported about the center shaft 27, about which the output gear 40 is supported, rational design and easy assembly are achieved.

Moreover, since the transmission path from the output gear 40 to the ratchet 19 is able to be provided by the electric open lever 43, rationality is achieved.

According to the disclosure, since a single operation of the output gear 40 ends in rotation of 180 degrees, with an amount of rotation less than the conventional amount, that is, in a short operation period, the door is able to be opened quickly.

According to the disclosure, the rotation-blocked state of the output gear 40 by the electric open lever 43 is able to be infallibly released with reasonable possibility.

According to the disclosure, a return spring that causes the output gear 40 to return to an initial position or a neutral position is able to be omitted.

According to the disclosure, since the output gear 40 and the manual open lever 28 are able to be supported by the same shaft, rational design and easy assembly work are achieved.

According to the disclosure, since the output gear 40 and the manual open lever 28 for emergency operation are able to be supported by the same shaft, rational design and easy assembly work are achieved.

According to the disclosure, since the output gear 40 and the manual open lever 28 are supported about the center shaft 27, the electric open lever 43 is supported about the support shaft 44, the latch 17 is supported about the latch shaft 18, and the ratchet 19 is supported about the ratchet shaft 20, each on the front side of the base member 16, and the emergency operation knob 36 is coupled to the manual open lever 28 from the reverse side of the base member via the emergency operation hole 35 of the base member 16, after the parts are assembled to the front side of the base member 16, the emergency operation knob 36 is able to be coupled to the manual open lever 28 from the reverse side and the assembly efficiency is expected to be improved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A latch device for a trunk lid of a vehicle, the latch device comprising:
   a latch configured to engage with a striker;
   a ratchet configured to engage with the latch and to hold an engaged state between the latch and the striker;
   an electric open lever configured to cause the ratchet to withdraw from the latch when the electric open lever rotates; and
   a release actuator configured to rotate the electric open lever, wherein
   an output gear configured to rotate by driving force of the release actuator is provided near the electric open lever,
   a pair of a first cam projection and a second cam projection with phases shifted from each other by 180 degrees is provided in the output gear,
   the output gear is configured such that the first cam projection abuts against the electric open lever and rotates the electric open lever when the output gear rotates by 180 degrees, and rotation of the output gear is blocked by the second cam projection abutting against the rotated electric open lever, and the latch device is configured such that a rotation-blocked state of the output gear, caused by the electric open lever, is released by a rotation of the electric open lever in conjunction with a displacement of the ratchet relative to the latch by a resilience of a ratchet spring upon door closure.

2. The latch device for the trunk lid of the vehicle according to claim 1, wherein the output gear maintains a position immediately after the blockage due to reduction resistance of the release actuator side when the release actuator is turned OFF, after the rotation of the output gear is blocked by the abutment of the output gear against the electric open lever.

3. The latch device for the trunk lid of the vehicle according to claim 1, wherein the output gear is freely rotatably supported by a center shaft, and a manual open lever, which causes the ratchet to withdraw from the latch when the manual open lever is rotated by a manual door opening unit is supported by the center shaft.

4. The latch device for the trunk lid of the vehicle according to claim 1, wherein the output gear is freely rotatably supported by a center shaft, and a manual open lever, which causes the ratchet to withdraw from the latch when the manual open lever is rotated by operation on an emergency operation knob provided with an emergency symbol made of a phosphorescent material, is supported by the center shaft.

5. The latch device for the trunk lid of the vehicle according to claim 4, wherein the output gear and the manual open lever supported by the center shaft, the electric open lever supported by a support shaft, the latch supported by a latch shaft, and the ratchet supported by a ratchet shaft are disposed on a front side of the base member, and the emergency operation knob is coupled to the manual open lever from a reverse side of the base member via an emergency operation hole of the base member.

6. A latch device for the trunk lid of the vehicle, the latch device comprising:

a latch configured to engage with a striker;

a ratchet configured to engage with the latch and to hold an engaged state between the latch and the striker;

an electric open lever configured to cause the ratchet to withdraw from the latch; and a release actuator configured to rotate the electric open lever, wherein an output gear configured to rotate by driving force of the release actuator is provided near the electric open lever, a pair of a first cam projection and a second cam projection with phases shifted from each other by 180 degrees is provided in the output gear, a follower corner portion and a stopper corner portion configured to be each displaceable to a position facing on a rotational track of the first cam projection and second cam projection and to a position off the rotational track are provided at the electric open lever, the latch device is configured such that the electric open lever is rotated and the ratchet is withdrawn from the latch, by the follower corner portion, which is at the position facing on the rotational track abutting against one of the first cam projection and second cam projection when the output gear rotates and which is pushed out to the position off the rotational track when or before the output gear rotates by 180 degrees, the latch device is further configured such that the stopper corner portion at the position off the rotational track before the output gear rotates is displaced to the position facing on the rotational track by the rotation of the electric open lever when the ratchet is withdrawn from the latch by the rotation of the electric open lever, the latch device is configured such that the stopper corner portion displaced to the position facing on the rotational track abuts against the other one of the first cam projection and second cam projection and blocks rotation of the output gear upon and after the abutment, when the output gear rotates by 180 degrees, and the latch device is configured such that a rotation-blocked state of the output gear, caused by the electric open lever, is released by a rotation of the electric open lever in conjunction with a displacement of the ratchet relative to the latch by a resilience of a ratchet spring upon door closure.

7. The latch device for the trunk lid of the vehicle according to claim 6, wherein the output gear maintains a position immediately after the blockage due to reduction resistance of the release actuator side when the release actuator is turned OFF, after the rotation of the output gear is blocked by the abutment of the output gear against the electric open lever.

8. The latch device for the trunk lid of the vehicle according to claim 6, wherein the output gear is freely rotatably supported by a center shaft, and a manual open lever, which causes the ratchet to withdraw from the latch when the manual open lever is rotated by a manual door opening unit is supported by the center shaft.

9. The latch device for the trunk lid of the vehicle according to claim 6, wherein the output gear is freely rotatably supported by a center shaft, and a manual open lever, which causes the ratchet to withdraw from the latch when the manual open lever is rotated by operation on an emergency operation knob provided with an emergency symbol made of a phosphorescent material, is supported by the center shaft.

10. The latch device for the trunk lid of the vehicle according to claim 9, wherein the output gear and the manual open lever supported by the center shaft, the electric open lever supported by a support shaft, the latch supported by a latch shaft, and the ratchet supported by a ratchet shaft are disposed on a front side of the base member, and the emergency operation knob is coupled to the manual open lever from a reverse side of the base member via an emergency operation hole of the base member.

* * * * *